(12) United States Patent
Tan (10) Patent No.: US 10,491,636 B2
(45) Date of Patent: Nov. 26, 2019

(54) MANAGING SECURITY POLICY (71) Applicant: HANGZHOU DPTECH TECHNOLOGIES CO., LTD., Hangzhou (CN)

(72) Inventor: Tian Tan, Hangzhou (CN)

(73) Assignee: Hangzhou DPtech Technologies Co., Ltd., Hangzhou (CN)

( * ) Notice: Subject to any disclaimer, the term of this patent is extended or adjusted under 35 U.S.C. 154(b) by 214 days.

(21) Appl. No.: 15/654,535

(22) Filed: Jul. 19, 2017

(65) Prior Publication Data

US 2018/0027021 A1 Jan. 25, 2018

(30) Foreign Application Priority Data

Jul. 20, 2016 (CN) .......................... 2015 1 0581346

(51) Int. Cl.
*H04L 29/06* (2006.01)
*H04L 12/24* (2006.01)
(52) U.S. Cl.
CPC .......... *H04L 63/20* (2013.01); *H04L 41/0893* (2013.01); *H04L 41/046* (2013.01); *H04L 41/08* (2013.01); *H04L 41/0856* (2013.01)
(58) Field of Classification Search
CPC .... H04L 41/0893; H04L 63/20; H04L 63/205
See application file for complete search history.

(56) References Cited

U.S. PATENT DOCUMENTS

2002/0099671 A1* 7/2002 Mastin Crosbie ...... G06F 21/62
705/500
2015/0312311 A1* 10/2015 Subramanian ...... H04L 41/0246
709/223

FOREIGN PATENT DOCUMENTS

| CN | 1898916 A | 1/2007 |
|---|---|---|
| CN | 101431430 A | 5/2009 |
| CN | 102291440 A | 12/2011 |
| CN | 102891805 A | 1/2013 |

(Continued)

OTHER PUBLICATIONS

State Intellectual Property Office of the People's Republic of China, Office Action and Search Report Issued in Application No. 201610581346.4, dated Apr. 3, 2019, 17 pages.

(Continued)

*Primary Examiner* — Brandon S Hoffman
*Assistant Examiner* — Thong P Truong
(74) *Attorney, Agent, or Firm* — McCoy Russell LLP (57) ABSTRACT

According to an example, a network security device determines whether a number of rules with a same matching feature in a first policy database reaches a preset threshold, wherein the first policy database records one or more first policies, each of the first policies comprises a policy identity (ID) and a plurality of rules respectively associated with the policy ID, each of the rules comprises a matching feature and an action associated with the matching feature; and generates a second policy database recording one or more second policies, by reconstructing the first policies in the first policy database when the number of rules with the same matching feature reaches the preset threshold, wherein each of the second policies comprises a matching feature and a target two-tuple comprising a policy id and an action associated with the matching feature.

12 Claims, 2 Drawing Sheets

(56) References Cited

FOREIGN PATENT DOCUMENTS

CN    103338155 A    10/2013
CN    104468361 A    3/2015

OTHER PUBLICATIONS

State Intellectual Property Office of the People's Republic of China, Office Action and Search Report Issued in Application No. 201610581346.4, dated Sep. 30, 2018, 16 pages. (Submitted with Partial Translation).
State Intellectual Property Office of the People's Republic of China, Notification of Rejection of Decision Issued in Application No. 201610581346.4, dated Jul. 3, 2019, 13 pages (Submitted with Partial Translation).

* cited by examiner

MANAGING SECURITY POLICY

CROSS REFERENCE TO RELATED APPLICATIONS

The present disclosure claims priority to Chinese Patent Application No. 201610581346.4 entitled "A Method and Apparatus of Fast Matching a Single-Service With Multi-Policies" which is filed on Jul. 20, 2016, the entire content of which is incorporated herein by reference for all purposes.

TECHNICAL FIELD

The present disclosure relates to network communication technology fields, and more particularly, to a method of managing a security policy and a network security device.

BACKGROUND

In network security products, each single service is configured with a plurality of security strategies. Each security policy includes a plurality of rules, and each rule is formed by a matching feature and an action associated with the matching feature.

SUMMARY

In view of this, the present disclosure provides a method of managing a security policy and a network security device, so as to improve querying efficiency when performing matching with security policies.

In particular, the present disclosure is implemented by the following technical solutions.

One aspect of the present disclosure provides a method of managing a security policy, which includes:

determining, by a network security device, whether a number of rules with a same matching feature in a first policy database reaches a preset threshold, wherein the first policy database records one or more first policies, each of the first policies comprises a policy identity (ID) and a plurality of rules respectively associated with the policy ID, each of the rules comprises a matching feature and an action associated with the matching feature; and generating, by the network security device, a second policy database recording one or more second policies, by reconstructing the first policies in the first policy database when the number of rules with the same matching feature reaches the preset threshold, wherein each of the second policies comprises a matching feature and a target two-tuple comprising a policy id and an action associated with the matching feature.

Another aspect of the present disclosure provides a network security device, which includes a processor and a computer-readable storage medium storing machine readable instructions that are executable by the processor to:

determine whether a number of rules with a same matching feature in a first policy database reaches a preset threshold, wherein the first policy database records one or more first policies, each of the first policies comprises a policy identity (ID) and a plurality of rules respectively associated with the policy ID, each of the rules comprises a matching feature and an action associated with the matching feature; and generate a second policy database recording one or more second policies, by reconstructing the first policies in the first policy database when the number of rules with the same matching feature reaches the preset threshold, wherein each of the second policies comprises a matching feature and a target two-tuple comprising a policy id and an action associated with the matching feature.

As can be seen from the above technical solutions provided by the present disclosure, the network security device determines whether a number of rules with a same matching feature in a first policy database reaches a preset threshold, wherein the first policy database records one or more first policies, each of the first policies comprises a policy identity (ID) and a plurality of rules respectively associated with the policy ID, each of the rules comprises a matching feature and an action associated with the matching feature; and generates a second policy database recording one or more second policies, by reconstructing the first policies in the first policy database when the number of rules with the same matching feature reaches the preset threshold, wherein each of the second policies comprises a matching feature and a target two-tuple comprising a policy id and an action associated with the matching feature. According to examples of the present disclosure, the policies are reconstructed by taking the matching feature as the primary key, thus, it can be realized that when a packet is received, the packet is matched with the policies by taking the matching feature as the primary key, rather than by using a matching manner that the policy id is taken as the primary key, thereby avoiding to repeatedly match the policies having a same matching feature, and improving policy matching efficiency.

The details of one or more embodiments of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

An exemplary embodiment will be described in detail herein, examples of which are shown in the accompanying drawings. When the following description refers to the accompanying drawings, the same numerals in the different drawings denote the same or similar elements unless otherwise indicated. The embodiments described in the following exemplary embodiment are not representative of all embodiments consistent with the present disclosure. In contrast, they are merely examples of devices and methods consistent with some aspects of the present disclosure as detailed in the appended claims.

The terminology used in the present disclosure is for the purpose of describing particular embodiments only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to and includes any or all possible combinations of one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word such as "if" used herein may be interpreted as "when" or "as" or "determining in response to".

In a network security product, a single service is usually configured with many security policies, and each security policy usually includes a set of rules. Each rule is formed by a matching feature and an action to be executed after being matched to the matching feature.

There is usually a one-to-many mapping relationship between a policy and rules. When a packet is matched with policies, policies in the policy database are traversed in order to match a packet feature with all matching features in each policy. When the packet feature is matched to a corresponding matching feature, the action associated with the matching feature is executed to perform corresponding processing for the packet.

TABLE 1

| Policy Id | Rule | Two-Tuple <matching feature, action> |
|---|---|---|
| P1 | Rule1 | <Pattern1, Action1> |
|  | Rule2 | <Pattern2, Action2> |
|  | Rule3 | <Pattern3, Action3> |
| P2 | Rule4 | <Pattern4, Action4> |
|  | Rule5 | <Pattern5, Action5> |
|  | Rule6 | <Pattern6, Action6> |
| P3 | Rule7 | <Pattern7, Action7> |
|  | Rule8 | <Pattern8, Action8> |
|  | Rule9 | <Pattern9, Action9> |
| ... | ... | ... |

For example, above Table 1 is a format table of the security policy in the related art described in the present disclosure.

For example, as shown in Table 1, assuming that the security policy ids P1, P2, P3 correspond to three policies, each policy includes three rules, and each rule is formed by a matching feature and an action associated with the matching feature.

In the related art, when matching an obtained packet to be matched with the policies in the preset policy database, a network security device matches the packet with policies in a policy database in sequence by taking the policy id as the primary key.

In combination with the format table of the policy shown in Table 1, when the obtained packet is matched with the security policies, steps described below are executed:

(1) The obtained packet is matched with the policy with the policy id P1. In particular, the packet may be matched with a rule 1 which consists of Pattern1 and Action1. When the rule 1 is hit, the network security device executes Action 1 in the rule 1, and the packet continues to be matched with a rule 2 which consists of Pattern2 and Action2. When the rule 1 is not hit, the packet continues to be matched with the rule 2. After the matching process with the rule 2 finishes, the packet continues to be matched with a rule 3 until the packet is matched with all the rules in the policy with the policy id P1.

(2) After the matching process with the security policy with the policy id P1 is completed, the obtained packet is matched with the security policy with the policy id P2. In particular, the packet may be matched with a rule 4 which consists of Pattern4 and Action4. When the rule 4 is hit, the network security device executes Action4 in the rule 4, and the packet continues to be matched with a rule 5. When the rule 4 is not hit, the packet continues to be matched with the rule 5 until the packet is matched with all the rules in the security policy with the policy id P2.

(3) The packet is matched with the security policy with policy id P3, and the matching steps and an order of executing the steps are same as that when the packet is matched with the security policy with the policy id P1 and the security policy with the policy id P2. Herein, the number and the content of the rules respectively in the security policies with policy ids P1, P2, and P3 may be determined according to a user requirement and an actual test. The manner of the security policies configured in Table 1 is just for description convenience, and any of policies with policy ids P1, P2 and P3 may include a plurality of rules the number of which is different from that in Table 1.

As can be seen from the above solutions provided by the related art, when a network security device matches a received packet with policies in a preset policy database, the packet is matched with each policy in the policy database in sequence usually by taking a policy id as a primary key. However, when a security policy is configured, a user may not focus on whether matching features among security policies are repeated, and whether matching features among a currently-configured policy and previously-configured policies are repeated. Further, the actions associated with repeated matching features may be different from each other. In order to fully execute the actions included in each policy in the policy database, when matching the received packet with security policies, the network security device may match the received packet with all the policies one by one. Thus, when the number of security policies in the policy database is large, the number of the repeated matching features is large. When the manner that a packet is sequentially matched with policies in the policy database is still used, it causes low matching efficiency.

To solve the above problems in the related art, the present disclosure provides a method of managing a security policy. According to examples of the present disclosure, a network security device obtains a first policy to be added, wherein the first policy includes a mapping relationship between a policy id and a plurality of rules, each rule includes a first matching feature and an action associated with the first matching feature; determines whether the number of rules with a same first matching feature in a preset policy database reaches a preset threshold after adding the first policy into the preset policy database; and reconstructs first policies in the policy database when the number of the rules with the same first matching feature reaches the preset threshold to obtain second policies, wherein each second policy includes a second matching feature and a target two-tuple having a mapping relationship with the second matching feature, and the target two-tuple includes a policy id and an action associated with the second matching feature. According to examples of the present disclosure, the policies are reconstructed by taking the matching feature as the primary key, thus, it can be realized that when a packet is received, the packet is matched with the policies by taking the matching feature as the primary key, rather than by using a matching manner that the policy id is taken as the primary key, thereby avoiding to repeatedly match the policies having a same matching feature, and improving policy matching efficiency.

Figure 1:
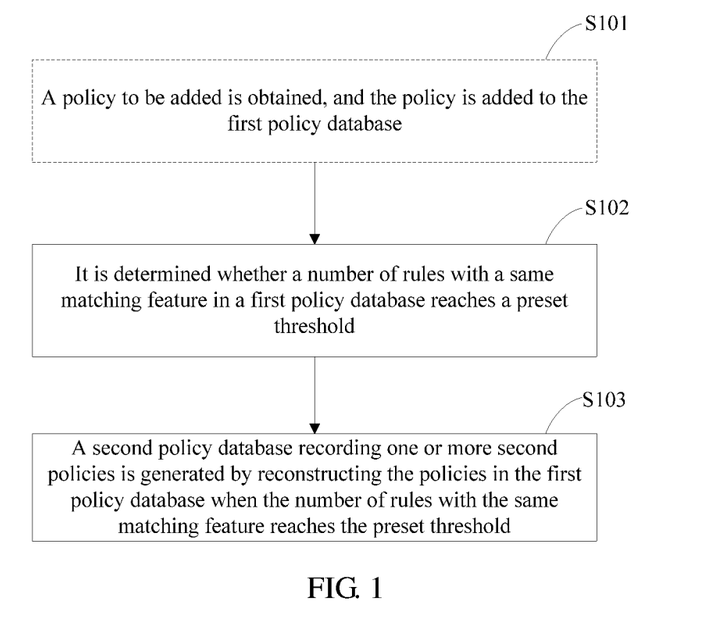
FIG. 1 is a flowchart illustrating a method of managing a security policy according to some examples of the present disclosure.

FIG. 1 is a flowchart illustrating a method of managing a security policy according to some examples of the present disclosure, which applies to a network security device side. The method includes procedures as follows.

At Block 102: it is determined whether a number of rules with a same matching feature in a first policy database reaches a preset threshold.

In some examples, the first policy database records one or more policies, each of the policies comprises a policy identity (ID) and a plurality of rules respectively associated with the policy ID, each of the rules comprises a matching feature and an action associated with the matching feature.

In the example, the policy in the first policy database may be referred to as a first policy.

At Block 103: a second policy database recording one or more second policies is generated by reconstructing the policies in the first policy database when the number of rules with the same matching feature reaches the preset threshold.

In some examples, each of the reconstructed policies comprises a matching feature and a target two-tuple comprising a policy id and an action associated with the matching feature.

In the example, the reconstructed policy in the second policy database may be referred to as a second policy.

In some examples, before block 102, the method may further include procedures as follows.

At Block 101: a policy to be added is obtained, and the policy is added to the first policy database.

In some examples, the policy is same with the policy described at block 102, which includes a mapping relationship between a policy identity (id) and a plurality of rules, and each rule is same with the rule described at block 102, which includes a matching feature and an action associated with the matching feature.

The network security device above may be a network security server, a router with a packet filtering function, or a router switch with a packet filtering function.

When a user newly adds a security policy, the network security device obtains the policy to be added. The format of the policy to be added is as shown in Table 1. In particular, the policy to be added includes the mapping relationship between the policy id and a plurality of rules, where a rule includes a matching feature and an action associated with the matching feature.

After the network security device obtains the policy to be added, the network security device determines whether the policies in the preset first policy database have been reconstructed. Referring to Table 2 for the reconstructed policy, Table 2 is a format table in which the policy is reconstructed as shown according to some examples of the present disclosure.

TABLE 2

| Matching feature | Two-Tuple <policy id, action> |
|---|---|
| Pattern1 | <P1, Action1> |
| Pattern2 | <P1, Action2> |
| Pattern3 | <P1, Action3> |
| Pattern4 | <P2, Action4> |
| Pattern5 | <P2, Action5> |
| Pattern6 | <P2, Action6> |
| Pattern7 | <P3, Action7> |
| Pattern8 | <P3, Action8> |

TABLE 2-continued

| Matching feature | Two-Tuple <policy id, action> |
|---|---|
| Pattern9 | <P3, Action9> |
| ... | ... |

As can be seen from Table 1 and Table 2, in the related art, a rule in a policy is expressed as:

$$\text{Rule}=<\text{Pattern, Action}> \quad (1\text{-}1)$$

According to the method provided by some examples of the present disclosure, a two-tuple in a policy is expressed as:

$$\text{Two-tuple}=<\text{P, Action}> \quad (1\text{-}2)$$

In the related art, the policy is a mapping relationship between the policy id and the rule shown in (1-1). In the method provided according to some examples of the present disclosure, the policy is a mapping relationship between the matching feature and the two-tuple shown in (1-2).

When the policy in the preset first policy database includes the mapping relationship between the policy id and the rule in (1-1), the network security device determines whether the number of rules with the same matching feature in the first policy database reaches a preset threshold after adding the obtained policy to the preset first policy database.

Herein, the reconstructed policies occupy a large storage space. Thus, when the network security device reconstructs the policies in a condition that there is no repeated matching feature or in a condition that the number of the repeated matching features in the policies is small, performance may not be improved, and a waste of storage space may be caused instead. Thus, according to the method provided in some examples of the present disclosure, whether the policies are reconstructed is dynamically determined based on the preset threshold.

The preset threshold may be configured by a user according to specific requirements. When the user configures that the policies are not reconstruct due to a reason such as a small storage space, the threshold may be set to a large value, i.e., the value is more than the total number of matching features. When the user has high performance requirements, the threshold may be set to a small value.

The network security device adds the obtained policy to the preset first policy database. When the number of the rules with the same matching feature reaches the preset threshold after the policy is added to the first policy database, the policies in the first policy database are reconstructed. In particular, a policy is reconstructed as a mapping relationship between the matching feature and the two-tuple in (1-2).

In some examples, after the policies in the first policy database are reconstructed, the policies with the same matching feature in the second policy database are combined by taking the matching feature as a primary key.

In order to avoid that the policies with the same matching features are repeatedly matched and to improve security policy matching efficiency, the policies with the same matching feature in the second policy database may be combined by taking the matching feature as the primary key.

Assuming that there are policies $P_x$, $P_y$ in the related art. Table 3 illustrates formats of the policies $P_x$, $P_y$.

TABLE 3

| Policy Id | Rule | Two-Tuple <matching feature, action> |
|---|---|---|
| $P_x$ | $Rule_a$ | <$Pattern_a$, $Action_a$> |
|  | $Rule_b$ | <$Pattern_b$, $Action_b$> |
|  | $Rule_c$ | <$Pattern_c$, $Action_c$> |
| $P_y$ | $Rule_d$ | <$Pattern_d$, $Action_d$> |
|  | $Rule_e$ | <$Pattern_e$, $Action_e$> |
|  | $Rule_f$ | <$Pattern_f$, $Action_f$> |

Table 4 is another format table for the reconstructed policies according to some examples of the present disclosure. Table 4 illustrates the reconstructed policies associated with the policies $P_x$, $P_y$.

TABLE 4

| Matching feature | Two-tuple <policy id, action> |
|---|---|
| $Pattern_a$ | <$P_x$, $Action_a$> |
| $Pattern_b$ | <$P_x$, $Action_b$> |
| $Pattern_c$ | <$P_x$, $Action_c$> |
| $Pattern_d$ | <$P_y$, $Action_d$> |
| $Pattern_e$ | <$P_y$, $Action_e$> |
| $Pattern_f$ | <$P_y$, $Action_f$> |

(a) When there is no same matching feature in the policies $P_x$ and $P_y$, i.e., $Pattern_a$, $Pattern_b$, $Pattern_c$, $Pattern_d$, $Pattern_e$, and $Pattern_f$ are different from each other, the two policies are combined by a set union operation, and after the combination is completed, there is no change in Table 4.

Referring to Table 2 and Table 4, when there is no same matching feature in the policies P1, P2, and P3 in Table 2, there is no change in Table 2 after the union operation is completed for Table 2.

(b) When there is a same matching feature in the policies $P_x$ and $P_y$, i.e., in $Pattern_a$, $Pattern_b$, $Pattern_c$, $Pattern_d$, $Pattern_e$ and $Pattern_f$, one matching feature is same with another matching feature. Assuming that $Pattern_c$=$Pattern_d$ and $Action_c$≠$Action_d$, the policies with the same matching feature may be combined as follows:

$NR_c$=<$Pattern_c$, {<$P_x$, $Action_c$>, <$P_y$, $Action_d$>}> or $NR_d$=<$Pattern_d$, {<$P_x$, $Action_c$>, <$P_y$, $Action_d$>}>

After combining the policies with the same matching feature, the set union operation is performed for the policies $P_x$ and $P_y$ according to the combining manner (a). The combined policies are shown in Table 5. Table 5 is another format table for the reconstructed policies according to some examples of the present disclosure.

TABLE 5

| Matching feature | Two-tuple <policy id, action> |
|---|---|
| $Pattern_a$ | <$P_x$, $Action_a$> |
| $Pattern_b$ | <$P_x$, $Action_b$> |
| $Pattern_c$/$Pattren_d$ | <$P_x$, $Action_c$>, <$P_y$, $Action_d$> |
| $Pattern_e$ | <$P_y$, $Action_e$> |
| $Pattern_f$ | <$P_y$, $Action_f$> |

Referring to Table 2 and Table 5, assuming that Pattern 3 =Pattern4 and Action3 Action4 in Table 2, The policies in Table 2 may be combined as the policies with a form shown in Table 6. Table 6 is another policy format table after the combining operation is performed according to some examples of the present disclosure.

TABLE 6

| Matching Feature | Two-Tuple <policy id, action> |
|---|---|
| Pattern1 | <P1, Action1> |
| Pattern2 | <P1, Action2> |
| Pattern3/Pattern4 | <P1, Action3>, <P2, Action4> |
| Pattern5 | <P2, Action5> |
| Pattern6 | <P2, Action6> |
| Pattern7 | <P3, Action7> |
| Pattern8 | <P3, Action8> |
| Pattern9 | <P3, Action9> |
| ... | ... |

In some examples, after the policies with the same matching feature are combined in the second policy database, the two-tuples with a same action in a same policy are combined by taking the action as a primary key.

(c) In case (b), when $Action_c$=$Action_d$, $NR_c$ and $NR_d$ may be further combined as:

$NR_c$=<$Pattern_c$, {<{$P_x$, $P_y$}, $Action_c$>}>

After the two-tuples satisfying the condition above are combined, the combining operation is performed for the policies according to the set union operation in case (a).

Referring to Table 2 and the combining manner above, assuming that Action3=Action4 in Table 2, the policies in Table 2 may be combined as the policies with a form shown in Table 7. Table 7 is another format table after the combining operation is performed according to some examples of the present disclosure.

TABLE 7

| Matching Feature | Two-Tuple <policy id, action> |
|---|---|
| Pattern1 | <P1, Action1> |
| Pattern2 | <P1, Action2> |
| Pattern3/Pattern4 | <{P1, P2}, Action3> |
| Pattern5 | <P2, Action5> |
| Pattern6 | <P2, Action6> |
| Pattern7 | <P3, Action7> |
| Pattern8 | <P3, Action8> |
| Pattern9 | <P3, Action9> |
| ... | ... |

When the number of rules with the same matching feature does not reach the preset threshold after adding the policy to the preset first policy database, the network security device adds the policy to the preset policy database, but does not reconstruct the policies in the first policy database, and sequentially performs matching with the policies in the first policy database according to the related art.

When the policy in the preset first policy database is a mapping relationship between the matching feature and the two-tuple shown in (1-2), the network security device reconstructs the policy to be added, and the reconstructed policy includes a mapping relationship between the matching feature and the two-tuple shown in (1-2). After the policy to be added is reconstructed, the reconstructed policy is added to the preset second policy database, and the combining operation is performed for the added policies and the policies in the second policy database. In particular, with reference to the combining operation for the policies in the second policy database in cases (a), (b) and (c), the combining operation is performed according to the format of the policies in the second policy database.

After the polices in the first policy database are reconstructed to generate the second policy database and the polices with the same matching feature are combined in the second policy database, if receiving a packet, the network security device may match the packet with the policies in the second policy database by taking the matching feature as a primary key.

In another example, when the policy in the second policy database is hit, it may be determined whether the policy corresponds to a plurality of two-tuples. When the policies correspond to the plurality of the two-tuples, an executing order of actions in the plurality of the two-tuples is set according to priorities associated with the policy ids in the plurality of the two-tuples.

Herein, the policies above are respectively preset with priorities. For example, different priorities are preset for the plurality of the policies. When a priority of a policy is set, the priority may be set according to the severity level of the action associated with the policy. In particular, each action corresponds to a severity level, which is set according to a severity degree of consequences caused by the action. Actions may be divided into two types, i.e., a blocking-type action and a non-blocking-type action. The blocking-type action may be executed once, and other actions may not be executed after the blocking-type action is executed. However, the non-blocking-type action may be executed a plurality of times. The severity level of the blocking-type action is higher than that of the non-blocking-type action. For example, a higher priority may be set for the policy with the blocking-type action, and the action associated with the policy is executed first.

1) When the hit policy includes a plurality of two-tuples including corresponding actions, an executing order may be designated for the actions. The executing order of the actions may be determined according to priorities associated with the policy ids in the two-tuples including the actions.

For example: $NR_c=<Pattern_c, \{<P_x, Action_c>, <P_y, Action_d>\}>$

The policy $NR_c$ above includes two two-tuples respectively including corresponding actions $Action_c$ and $Action_d$. The executing order of $Action_c$ and $Action_d$ may be determined according to the priorities associated with policy ids in the two-tuples. When $P_x$ corresponds a higher priority than $P_y$, the $Action_c$ is executed firstly when the policy $NR_c$ is hit; on the contrary. When the priority associated with $P_y$ is higher than that of $P_x$, the $Action_d$ is executed first when the policy $NR_c$ is hit.

2) When the plurality of the two-tuples in the hit policy includes a same action, for example:

$NR_c=<Pattern_c, \{<\{P_x, P_y\}, Action_c>, <P_z, Action_t>\}>$

In this case, the $Action_c$ takes maximum of priorities associated with $P_x$ and $P_y$ as the priority of $Action_c$. In particular, when the priority associated with $P_x$ is a higher that the priority associated with $P_y$, the priority associated with $P_x$ is taken as the priority of the $Action_c$; and when the priority associated with $P_y$ is higher than the priority associated with $P_x$, the priority associated with $P_y$ is taken as the priority of the $Action_c$. After the priority of the $Action_c$ is determined, the executing order of $Action_c$ and $Action_t$ is determined with reference to the manner in case 1).

In another example, when the hit policy includes a two-tuple, and at least one action in the two-tuple is executed, or, when the actions in a plurality of two-tuples are sequentially executed based on an executing order set according to the priorities, for each two tuple, it may be determined whether the two-tuple corresponds to a plurality of actions; if yes, the action executing order may be set according to the priorities preset for the plurality of the actions.

Herein, the actions above are preset with different priorities. When a priority of an action is set, the action corresponds to a severity level, which is set according to a severity degree of the consequences caused by the action. Actions may be divided into two types, i.e., a blocking-type action and a non-blocking-type action. The blocking-type action may be executed once, and other actions may not be executed after the blocking-type action is executed, but the non-blocking-type action may be executed a plurality of times. The severity level of the blocking-type action is higher than that of the non-blocking-type action. For example, a user configures that only a blocking-type action is executed. Since there is exclusiveness among blocking-type actions, only one blocking-type action is executed. In particular, an action with a maximum level value is placed in the forefront of an action list.

3). When the hit policy includes a two-tuple, and the two-tuple corresponds to a plurality of actions, for example:

$NR_c=<Pattern_c, \{<P_x, \{Action_c, Action_d\}>\}>$

In this case, an executing order of $Action_c$ and $Action_d$ is determined according to the priorities of the actions. The action with a high priority may be executed firstly, and the action with a low priority may be executed later.

The executing order of actions may be customized by a user when security policies are configured. An action with a high priority may not necessarily be executed first, for example, an action with a low priority may be executed firstly.

There is a case as follow, in the case, a policy includes a two-tuple, and the two-tuple includes an action:

$NR_a=<Pattern_a, <P_x, Action_a>>$

In this case, the $Action_a$ is executed.

4) When the hit policy includes a plurality of two-tuples and the actions in the plurality of the two-tuples are executed according to an executing order set based on priorities, an executed two-tuple may include a plurality of actions, for example:

$NR_x=<Pattern_x, \{<P_x, \{Action_x, Action_y, Action_z\}>, <P_m, Action_m>, <P_n, Action_n>\}>$ Based on the executing order set based on the priorities, the actions associated with $P_x$ are executed first, and the action associated with $P_m$ is executed next, and the action associated with $P_n$ is executed last. At this time, $P_x$ corresponds to three actions $Action_x$, $Action_y$, and $Action_z$. In this case, the executing order of $Action_x$, $Action_y$, and $Action_z$ is determined based on the priorities of $Action_x$, $Action_y$, and $Action_z$, and the action with a high priority is executed first. Further, according to user requirements, it may be set that the action with a low priority is executed first.

As can be seen from the technical solution above provided according to some examples of the present disclosure, the network security device the network security device determines whether a number of rules with a same matching feature in a first policy database reaches a preset threshold, wherein the first policy database records one or more first policies, each of the first policies comprises a policy identity (ID) and a plurality of rules respectively associated with the policy ID, each of the rules comprises a matching feature and an action associated with the matching feature; and generates a second policy database recording one or more second policies, by reconstructing the first policies in the first policy database when the number of rules with the same matching feature reaches the preset threshold, wherein each of the second policies comprises a matching feature and a target two-tuple comprising a policy id and an action associated with the matching feature. According to examples of the present disclosure, the policies are reconstructed by taking the matching feature as the primary key, thus, it can be realized that when a packet is received, the packet is matched with the security policy by taking the matching feature as the primary key, rather than by using a matching manner that the policy id is taken as the primary key, thereby avoiding to repeatedly match the policies having a same matching feature, and improving policy matching efficiency.

Further, after the policies are reconstructed, the policies in the second policy database are combined by taking the matching feature as a primary key, thereby reducing a size of a two-tuple in the second policy database and saving storage space.

In addition, after the combining operation is performed for the policies in the second policy database, a plurality of actions in a plurality of two-tuples are set with priorities, thereby achieving flexible customization for the executing order.

Figure 2:
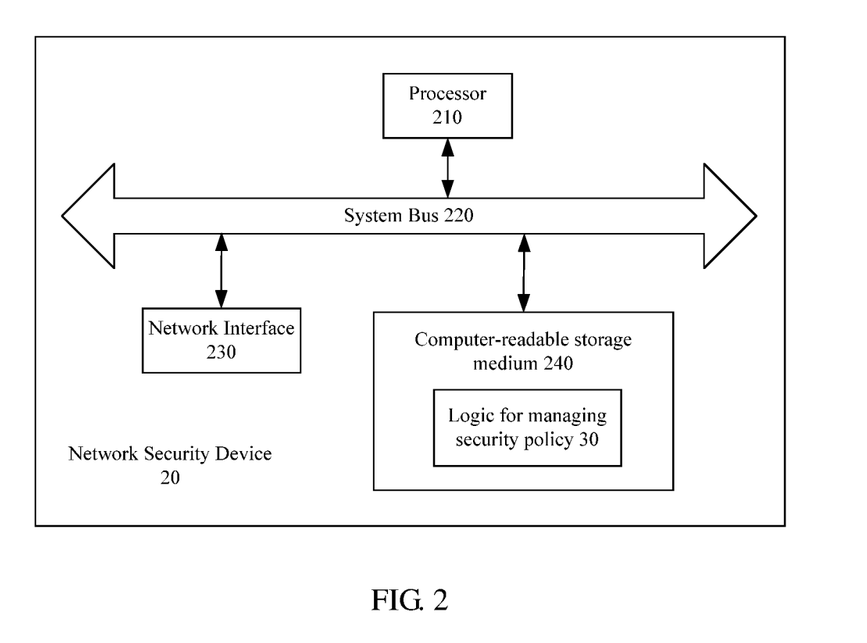
FIG. 2 is a schematic diagram illustrating a hardware structure of a network security device according to some examples of the present disclosure.

Corresponding to examples of the method for managing a security policy above, the present disclosure further provides a network security device. The network security device includes logic of managing a security policy. The logic may be implemented by software, or by hardware, or by a combination of hardware and software. Software implementation is taken as an example. The logic of managing a security policy is formed by a manner as follows: the processor of the network security device reads computer program instructions stored in a computer-readable storage medium (e.g., a memory, a non-volatile memory) into a memory, and executes the computer program instructions in the memory. From perspective of hardware, FIG. 2 is a schematic diagram illustrating a hardware structure of a network security device according to some examples of the present disclosure. Except a processor 210, a computer-readable storage medium 240 (e.g., a memory, a non-volatile memory), an internal bus 220, and a network interface 230 in FIG. 2, the network security device in some examples may further include other hardware according to actual functions of managing a security policy, which is not repeatedly described.

Figure 3:
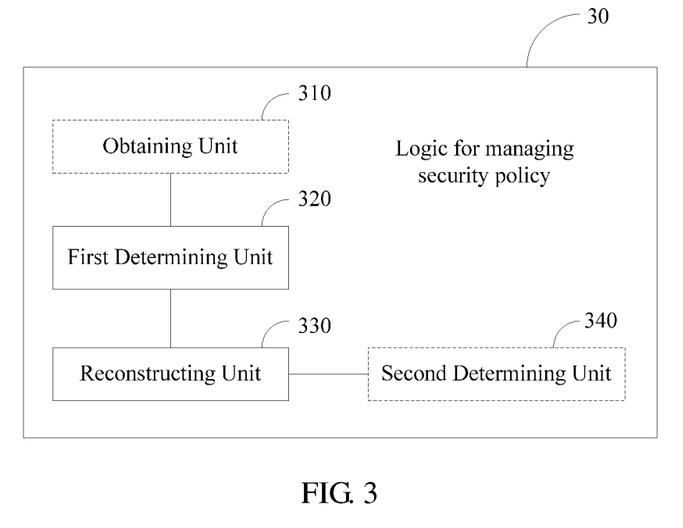
FIG. 3 is a schematic diagram illustrating a structure of logic of managing a service according to some examples of the present disclosure.

FIG. 3 illustrates a structure of logic of managing a security policy according to some examples of the present disclosure, which applies to a network security device. Functionally, the logic 30 includes: a first determining unit 320 and a reconstructing unit 330.

The first determining unit 320 is to determine whether a number of rules with a same matching feature in a first policy database reaches a preset threshold, wherein the first policy database records one or more first policies, each of the first policies comprises a policy identity (ID) and a plurality of rules respectively associated with the policy ID, each of the rules comprises a matching feature and an action associated with the matching feature.

The reconstructing unit 330 is to generate a second policy database recording one or more second policies, by reconstructing the first policies in the first policy database when the number of rules with the same matching feature reaches the preset threshold, wherein each of the second policies comprises a matching feature and a target two-tuple comprising a policy id and an action associated with the matching feature.

In some examples, the reconstructing unit 330 is further to combine the second policies with a same matching feature in the second policy database by taking the matching feature as a primary key.

In some examples, the reconstructing unit 330 is further to combine the target two-tuples with a same action within one of the second policies by taking the action as a primary key.

In some examples, the logic 30 further includes the second determining unit 340. The second determining unit 340 is to determine whether a hit second policy in the second policy database associated with a plurality of target two-tuples; and execute the actions in the plurality of target two-tuples associated with the hit second policy in a descending order of respective first priority associated with the policy IDs in the plurality of the target two-tuples, wherein each of the first policies further comprises the first priority associated with the policy ID.

In some examples, the second determining unit 340 is further to determine whether the target two-tuple comprises a plurality of actions; and execute the plurality of actions in a descending order of respective second priorities associated with the plurality of actions, wherein, each of the first policies further comprises the second priority associated with the action in each of the rules.

In some examples, the logic further includes an obtaining unit 301. The obtaining unit 301 is to acquire a third policy to be added which is in a same format with the first policy; reconstruct the third policy into a fourth policy which is in a same format with the second policy; and add the fourth policy into the second policy database.

The implementation of the functions and effects of the respective units in the logic above is described in detail in the implementation of corresponding blocks in the method above, which will not be repeatedly described.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be executed by the one or more processors; reference in this disclosure or the claims to a 'processor' should thus be interpreted to mean 'one or more processors'.

The figures are only illustrations of an example, where the units or procedure shown in the figures are not necessarily essential for implementing the present disclosure. Those skilled in the art will understand that the units in the device in the example may be arranged in the device in the examples as described, or may be alternatively located in one or more devices different from that in the examples. The units in the examples described may be combined into one module or further divided into a plurality of sub-units.

Although the flowcharts described show a specific executing order, the executing order may differ from that which is depicted. For example, the executing order of two or more blocks may be changed relative to the order shown. Also, two or more blocks shown in succession may be executed concurrently or with partial concurrence. All such variations are within the scope of the present disclosure.

For simplicity and illustrative purposes, the present disclosure is described by referring mainly to an example thereof. In the following description, numerous specific details are set forth to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes"

means includes but not limited to, the term "including" means including but not limited to, and the term "based on" means based at least in part on.

Throughout the present disclosure, the word "include", or variations such as "includes" or "including", will be understood to imply the inclusion of a stated element, integer or block, or group of elements, integers or blocks, but not the exclusion of any other element, integer or block, or group of elements, integers or blocks.

It will be appreciated by persons skilled in the art that numerous variations and/or modifications may be made to the above embodiments, without departing from the broad general scope of the present disclosure. The present embodiments are, therefore, to be considered in all respects as illustrative and not restrictive.

The invention claimed is:

1. A method of managing a security policy in a network security device, comprising:
   when a policy to be added is obtained, determining, by the network security device, whether one or more first policies recorded in a first policy database have been reconstructed, wherein each of the first policies comprises a policy identity (ID) and a plurality of rules respectively associated with the policy ID, each of the rules comprises a matching feature and an action associated with the matching feature;
   when determining that the one or more first policies in the first policy database are not reconstructed, adding, by the network security device, the obtained policy to the first policy database;
   determining, by the network security device, whether a number of rules with a same matching feature in the first policy database reaches a preset threshold, wherein the first policy database records the one or more first policies; and
   generating, by the network security device, a second policy database recording one or more second policies, by reconstructing the first policies and the obtained policy in the first policy database when the number of rules with the same matching feature reaches the preset threshold, wherein each of the second policies comprises a matching feature and a target two-tuple comprising a policy ID and an action associated with the matching feature.

2. The method according to claim 1, further comprising:
   combining, by the network security device, the second policies with a same matching feature in the second policy database by taking the matching feature as a primary key.

3. The method according to claim 2, further comprising:
   combining, by the network security device, the target two-tuples with a same action within one of the second policies by taking the action as a primary key.

4. The method according to claim 2, further comprising:
   determining, by the network security device, whether a hit second policy in the second policy database is associated with a plurality of target two-tuples; and
   executing, by the network security device, the actions in the plurality of target two-tuples associated with the hit second policy in a descending order of respective first priority associated with the policy IDs in the plurality of the target two-tuples, wherein each of the first policies further comprises a first priority associated with the policy ID.

5. The method according to claim 4, wherein executing the action in the target two-tuple associated with the hit second policy comprises:

determining, by the network security device, whether the target two-tuple comprises a plurality of actions; and
executing, by the network security device, the plurality of actions in a descending order of respective second priorities associated with the plurality of actions, wherein, each of the first policies further comprises the second priority associated with the action in each of the rules.

6. The method according to claim 1, further comprising:
   acquiring, by the network security device, a third policy to be added which is in a same format with the first policy;
   reconstructing, by the network security device, the third policy into a fourth policy which is in a same format with the second policy; and
   adding, by the network security device, the fourth policy into the second policy database.

7. A network security device comprising:
   a processor and a computer-readable storage medium storing machine readable instructions that are executable by the processor to:
   when a policy to be added is obtained, determine whether one or more first policies recorded in a first policy database have been reconstructed, wherein each of the first policies comprises a policy identity (ID) and a plurality of rules respectively associated with the policy ID, each of the rules comprises a matching feature and an action associated with the matching feature;
   when determining that the one or more first policies in the first policy database are not reconstructed, add the obtained policy to the first policy database;
   determine whether a number of rules with a same matching feature in the first policy database reaches a preset threshold; and
   generate a second policy database recording one or more second policies, by reconstructing the first policies and the obtained policy in the first policy database when the number of rules with the same matching feature reaches the preset threshold, wherein each of the second policies comprises a matching feature and a target two-tuple comprising a policy ID and an action associated with the matching feature.

8. The device according to claim 7, wherein the instructions are further configured to:
   combine the second policies with a same matching feature in the second policy database by taking the matching feature as a primary key.

9. The device according to claim 8, wherein the instructions are further configured to:
   combine the target two-tuples with a same action within one of the second policies by taking the action as a primary key.

10. The device according to claim 8, wherein the instructions are further configured to:
    determine whether a hit second policy in the second policy database is associated with a plurality of target two-tuples; and
    execute the actions in the plurality of target two-tuples associated with the hit second policy in a descending order of respective first priority associated with the policy IDs in the plurality of the target two-tuples, wherein each of the first policies further comprises the first priority associated with the policy ID.

11. The device according to claim 10, wherein the instructions are to:
    determine whether the target two-tuple comprises a plurality of actions; and execute the plurality of actions in a descending order of respective second priorities associated with the plurality of actions, wherein, each of the first policies further comprises the second priority associated with the action in each of the rules.

12. The device according to claim 7, wherein the instructions are further to:
acquire a third policy to be added which is in a same format with the first policy;
reconstruct the third policy into a fourth policy which is in a same format with the second policy; and
add the fourth policy into the second policy database.

* * * * *

UNITED STATES PATENT AND TRADEMARK OFFICE
CERTIFICATE OF CORRECTION

PATENT NO. : 10,491,636 B2  
APPLICATION NO. : 15/654535  
DATED : November 26, 2019  
INVENTOR(S) : Tian Tan Page 1 of 1

It is certified that error appears in the above-identified patent and that said Letters Patent is hereby corrected as shown below:

On the Title Page

(30) Foreign Application Priority Data should read:  
Jul. 20, 2016 (CN) .............. 2016 1 0581346

Signed and Sealed this  
Twenty-fourth Day of November, 2020

Andrei Iancu  
*Director of the United States Patent and Trademark Office*